United States Patent
Mori et al.

[11] Patent Number: 5,904,911
[45] Date of Patent: May 18, 1999

[54] MANGANESE-CONTAINING COMPLEX OXIDE, AND PROCESS FOR PREPARING COMPLEX PEROVSKITE COMPOUND COMPOSITION BY USE OF THIS COMPLEX OXIDE

[75] Inventors: Toru Mori; Atsushi Ochi, both of Tokyo; Shinji Ito, Hyogo; Hiroshi Ishikawa, Hyogo; Tadahiko Horiguchi, Hyogo, all of Japan

[73] Assignee: NEC Corporation, Tokyo, Japan

[21] Appl. No.: 09/031,763

[22] Filed: Feb. 27, 1998

[30] Foreign Application Priority Data

Feb. 28, 1997 [JP] Japan ............................ 9-046170

[51] Int. Cl.$^6$ .......................... C01B 13/14; C01F 13/14; C01G 49/00; H01M 4/50
[52] U.S. Cl. .................. 423/592; 423/592; 423/593; 423/594; 423/599; 423/606; 423/622; 429/224
[58] Field of Search .................. 423/592, 593, 423/594, 599, 606, 622; 429/224

[56] References Cited

U.S. PATENT DOCUMENTS

| 5,262,369 | 11/1993 | Mori et al. | 501/136 |
| 5,275,988 | 1/1994 | Mori et al. | 501/136 |
| 5,506,077 | 4/1996 | Koksbang | 429/224 |
| 5,672,329 | 9/1997 | Okada et al. | 423/599 |

FOREIGN PATENT DOCUMENTS

| 56-103486 | 8/1981 | Japan . |
| 57-42167 | 3/1982 | Japan . |
| 58-74569 | 5/1983 | Japan . |
| 1-94649 | 4/1989 | Japan . |

OTHER PUBLICATIONS

S.L. Swartz et al., "Fabrication of Perovskite Lead Magnesium Niobate", Mat. Res. Bull., vol. 17, No. 10, 1982, pp. 1245–1250.

*Primary Examiner*—Gary P. Straub
*Assistant Examiner*—Cam N. Nguyen
*Attorney, Agent, or Firm*—Sughrue, Mion, Zinn, Macpeack & Seas, PLLC

[57] ABSTRACT

There are herein disclosed a raw material for a complex perovskite ceramic composition which is intended to uniformly disperse a trace amount of an addition component (manganese) therein, and a process for preparing the ceramic composition.

A manganese-containing composite oxide is represented by the general formula $(Mn_aMeI_{1-a})MeII_bO_c$ wherein $a$ is a value in the range of $0<a\leq 0.3$; MeI is at least one of Mg, Ni and Zn; MeII is one of Nb, Ta and W; when MeII is Nb or Ta, $b$ is 2 and $c$ is 6, or when MeII is W, $b$ is 1 and $c$ is 4. By the use of a raw material containing this manganese-containing complex oxide, there can be prepared an Mn-containing complex perovskite compound composition which contains Mn and at least one of complex perovskite compounds represented by the general formula $Pb(BIBII)O_3$ wherein BI is one of Mg, Ni and Zn; and BII is one of Nb, Ta and W.

3 Claims, 4 Drawing Sheets

MANGANESE-CONTAINING COMPLEX OXIDE, AND PROCESS FOR PREPARING COMPLEX PEROVSKITE COMPOUND COMPOSITION BY USE OF THIS COMPLEX OXIDE

BACKGROUND OF THE INVENTION

1. Field of the Invention

The present invention relates to a raw material for a complex perovskite ceramic composition for use in electronic materials and a process for preparing the ceramic composition.

2. Description of the Prior Art

Complex perovskite compounds containing lead (Pb) have been widely used in dielectric materials and piezoelectric materials. The dielectric materials have been mainly used in multilayer ceramic capacitors. For example, in Japanese Patent Application Laid-Open No. 42167/1982, a ceramic composition comprising $Pb(Mg_{1/2}W_{1/2})O_3$—$PbTiO_3$—$Pb(Ni_{1/3}Nb_{2/3})O_3$ has been disclosed, and in Japanese Patent Application Laid-Open No. 74569/1983, a ceramic composition comprising $Pb(Zn_{1/3}Nb_{2/3})O_3$—$Pb(Mg_{1/2}W_{1/2})O_3$—$PbTiO_3$ has been disclosed.

As the composite perovskite compounds for use in the piezo-electric materials, $Pb(Mg_{1/3}Nb_{2/3})O_3$—$PbTiO_3$, $Pb(Zn_{1/3}Nb_{2/3})O_3$—$PbTiO_3$ and the like are known. To the complex perovskite compounds containing lead, manganese has often been added.

For example, the dielectric materials have been used for the prevention of the deterioration of insulation resistance or for the improvement of temperature characteristics of dielectric constant On the other hand, as the piezo-electric materials, there have been reported characteristic compositions of composite perovskite compounds containing Mn. For example, in Japanese Patent Application Laid-Open No. 103486/1981, (Pb, Sr)TiO$_3$—(Mn$_{1/3}$Sb$_{2/3}$)O$_3$ and the like have been disclosed.

In the case that a trace amount of Mn is added to the ceramic composition, manganese carbonate ($MnCO_3$) or $MnO_2$ has often been used as a raw material which is insoluble in water and which has a small particle diameter, if water is used as a dispersant.

On the other hand, there has been reported an example where a composite oxide as a raw material is used as one means for increasing a ratio of a product phase of a perovskite phase and for improving dielectric properties. For example, in Mat. Res. Bull., No. 17, p. 1245 (1982), Swartz et al. have reported that the employment of $MgNb_2O_6$ in a $Pb(Mg_{1/3}Nb_{2/3})O_3$ system is effective to improve the dielectric properties, and on the other hand, Japanese Patent Application Laid-Open No. 94649/1989 has disclosed that it is effective for the improvement of the dielectric properties to use $MgWO_4$ in a $Pb(Mg_{1/2}W_{1/2})O_3$ system.

Since the amount of Mn to be added or to be replaced is usually several mol % or less in terms of MnO, it is difficult to uniformly mix the same. As a means for uniformly mixing the trace amount of the component in the complex perovskite compound containing Mn, for example, Japanese Patent Application Laid-Open No. 54122/1991 has disclosed a technique for improving the characteristics by doing, in a solution, a synthesis with an organic metal compound such as a metal alkoxide as a raw material.

However, when the synthesis is done by this technique, it is required to use a more expensive organic metal oxide as the raw material than a usual oxide, which is industrially disadvantageous.

SUMMARY OF THE INVENTION

Under such circumstances, one technical object of the present invention is to provide a novel manganese (Mn) containing complex oxide.

In addition, another technical object of the present invention is to provide a process for preparing a complex perovskite compound composition using an Mn-containing complex oxide which can be used in multilayer ceramic capacitors and in which insulation resistance is less uneven and scarcely deteriorates.

In order to achieve the above objects, the present inventors have intensively investigated, and as a result, it has been found that a novel complex oxide which can be used as a raw material is effective, and the use of this complex oxide as the raw material is also effective in preparing a complex perovskite compound containing lead. In consequence, the present invention has now been attained.

That is to say, a first aspect of the present invention is directed to a manganese-containing complex oxide represented by the general formula $(Mn_aMeI_{1-a})MeII_bO_c$ wherein MeI is one of Mg, Ni and Zn; $a$ is a value in the range of $0 < a \leq 0.3$; MeII is one of Nb, Ta and W; when MeII is Nb or Ta, $b$ is 2 and $c$ is 6, or when MeII is W, $b$ is 1 and $c$ is 4. Here, in the present invention, $a$ is preferably a value in the range of $0.05 \leq a \leq 0.3$.

Furthermore, a second aspect of the present invention is directed to a process for preparing a ceramic composition comprising a complex perovskite compound which contains Mn and at least one of complex perovskite compounds represented by the general formula $Pb(BIBII)O_3$ wherein BI is one of Mg, Ni and Zn; and BII is one of Nb, Ta and W, wherein the complex oxide of the above first aspect is used.

In addition, a third aspect of the present invention is directed to a process for preparing a complex perovskite compound composition wherein 2 to 5 kinds of the complex perovskite compounds of the second aspect are used.

In the preparation of the manganese-containing complex oxide of the present invention, a high temperature of 1,100 to 1,300° C. is necessary and this temperature is much higher than a perovskite production temperature. Therefore, even if this complex oxide is used as a raw material of the complex perovskite compound, it does not decompose during the preparation process, and the trace component can be uniformly dispersed.

DETAILED DESCRIPTION OF THE INVENTION

Next, the present invention will be described in more detail with reference to drawings in accordance with some examples regarding the present invention. The scope of the present invention should not be limited to these examples.

EXAMPLE 1

Figure 1:
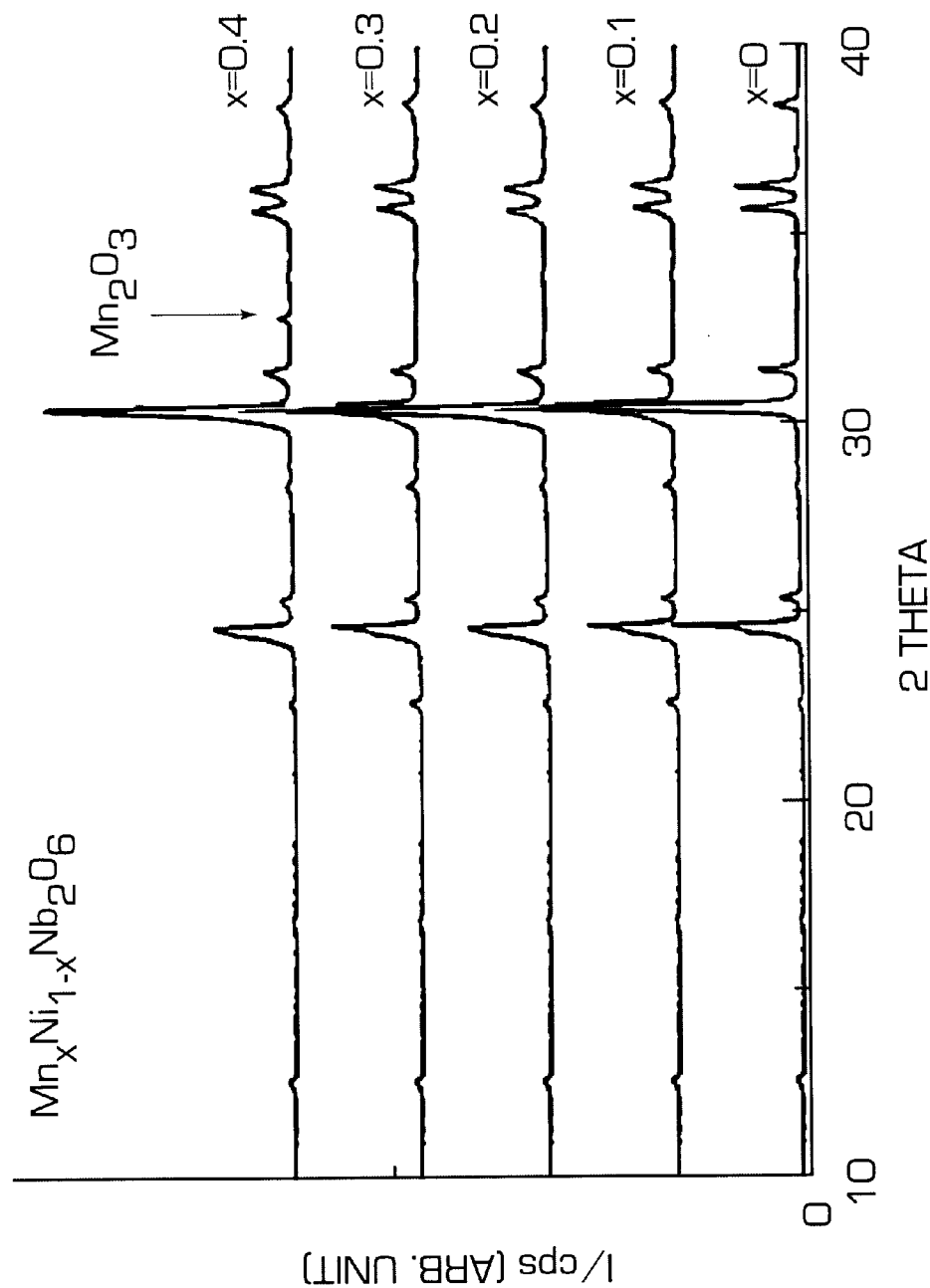
FIG. 1 shows a powder X ray diffraction pattern by CuKα of an Mn-containing complex oxide $(Mn_xNi_{1-x})Nb_2O_6$, wherein x is in the range of 0 to 0.4, prepared in Example 1 regarding the present invention.
Figure 2:
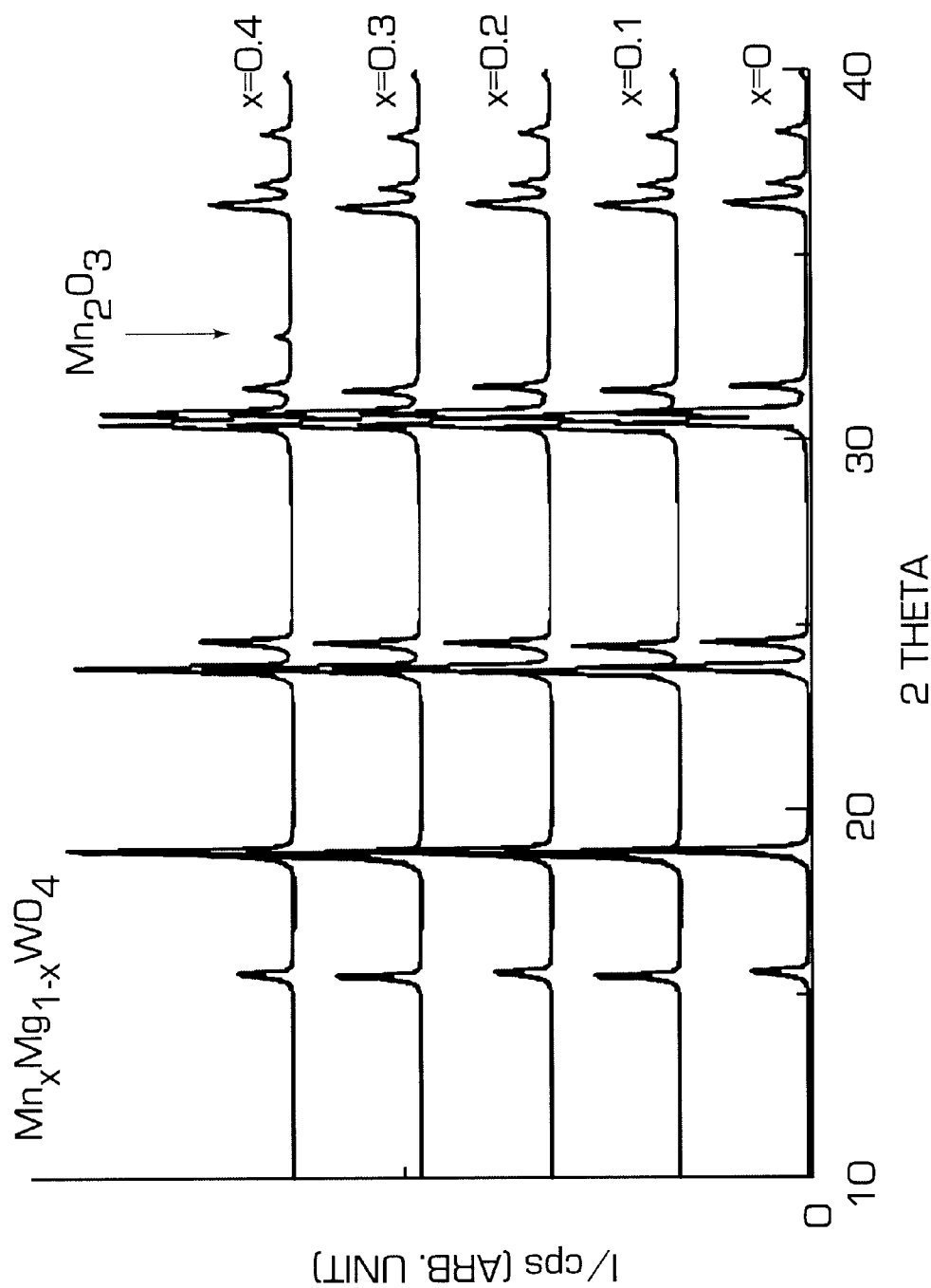
FIG. 2 shows a powder X ray diffraction pattern by CuKα of an Mn-containing complex oxide $(Mn_xMg_{1-x})WO_4$, wherein x is in the range of 0 to 0.4, prepared in Example 1 of the present invention.

In order to inspect a solid solubility limit of a complex oxide used as a raw material, $(Mn_xNi_{1-x})Nb_2O_6$ and $(Mn_xMg_{1-x})WO_4$ were used as raw materials of complex perovskite compounds, and X ray diffraction patterns in the case of $0 \leq x \leq 0.40$ were measured and then shown in FIGS. 1 and 2. Incidentally, a preparation process of this complex oxide will be described in undermentioned Example 2.

It is apparent from FIGS. 1 and 2 that even when Mg, Ni and Zn of $MgNb_2O_6$, $NiNb_2O_6$ and $ZnNb_2O_6$ having a columbite structure as well as $MgWO_4$ having a wolframite structure (another name=a nickel tungstate type structure) were partially replaced with Mn, their crystalline structures did not change, and complex oxides having single structures were obtained in which a manganese oxide ($Mn_2O_3$) was not observed on an X ray diffraction chart. In the respective cases, a replacement ratio is limited to 30%, and if the replacement ratio is higher than this level, $Mn_2O_3$ appears on the X ray diffraction chart. In consequence, the obtained oxides cannot be considered any more to be the complex oxides having the single structures. These complex oxides containing Mn have not been referred to even in Inorganic Alphabetical Index (International Centre for Diffraction Data, 1995) which is a compilation of X ray diffraction patterns of inorganic compounds synthesized until now. Therefore, these oxides can be judged to be novel substances.

Here, a replacement ratio $\underline{x}$ of Mn is effective in the range of $0 < x \leq 0.30$, but from the viewpoint of a ratio between an amount of MnO (conversion) to be added to the ceramic composition and a main component composition, the replacement ratio $\underline{x}$ is suitably in the range of $0.05 < x \leq 0.2$. For example, when 0.5 mol % of MnO is added to a composition containing 30 mol % of $Pb(Mg_{1/3}Nb_{2/3})O_3$, the replacement ratio of $\underline{x} \geq 0.05$ is required. If not so, it is necessary to add another manganese oxide such as $MnCO_3$. On the contrary, if the replacement ratio $\underline{x}$ is too high, large amounts of MgO and $Nb_2O_5$ are supplementally required. In consequence, an uniform dispersion effect of manganese can be obtained, but there is a fear that reactions of the other oxides are not sufficiently carried out.

Therefore, it is not preferable to heighten the replacement ratio $\underline{x}$ of Mn prior to the precipitation of the manganese oxide ($Mn_2O_3$).

EXAMPLE 2

A composition comprising 4 kinds of complex perovskite compounds was used as a ceramic composition, and its composition ratio was 30 $Pb(Mg_{1/3}Nb_{2/3})O_3$–50 $Pb(Ni_{1/3}Nb_{2/3})O_3$–20 $PbTiO_3$+1.5 mol % of $Pb(Mn_{1/3}Nb_{2/3})O_3$. As raw materials, PbO and $(Mn_{0.3}Ni_{0.7})Nb_2O_6$ were used, and $(Mn_{0.3}Ni_{0.7})Nb_2O_6$ was obtained by weighing predetermined amounts of $MnCO_3$, NiO and $Nb_2O_5$, wet-mixing them together with lead core resin balls as a medium in a resin pot for 72 hours, calcining the mixture at 950 to 1000° C. for 8 hours, wet-grinding the calcined mixture for 72 hours, further calcining it at 1,150 to 1,200° C. again, and then wet-grinding it for 72 hours again. The weighed materials were similarly wet-mixed together with the lead core resin balls as the medium in the resin pot for 72 hours, followed by filtration and drying. After calcination at 800 to 900° C., the calcined material was mixed again in a wet state in the same manner for 72 hours, followed by filtration. The resulting cake was dried and then ground to obtain a powder of the ceramic composition. The thus obtained dielectric powder was mixed with an organic solvent and a binder to prepare a slurry, and from this slurry, ceramic green sheets having thicknesses of $15\pm2$ $\mu m$ and $10\pm1$ $\mu m$ were formed in accordance with a doctor blade method. Next, printing was done with a silver palladium paste on the green sheets by a screen printing method to form internal electrodes thereon, and they were cut into a predetermined shape. After lamination and thermocompression bonding, they were cut into chips.

The number of the laminated green sheets was in the range of 70 to 100. The respective cut chips were put side by side on a setter, and the binder was then removed at 400 to 500° C. Afterward, the chips were fired in a predetermined profile in a rectangular shaped crusible. At this times a firing temperature was in the range of 1,000 to 1,100° C. Next, a silver paste was applied onto the fired chips to form external electrodes, thereby obtaining a multilayer ceramic capacitor.

Figure 3:
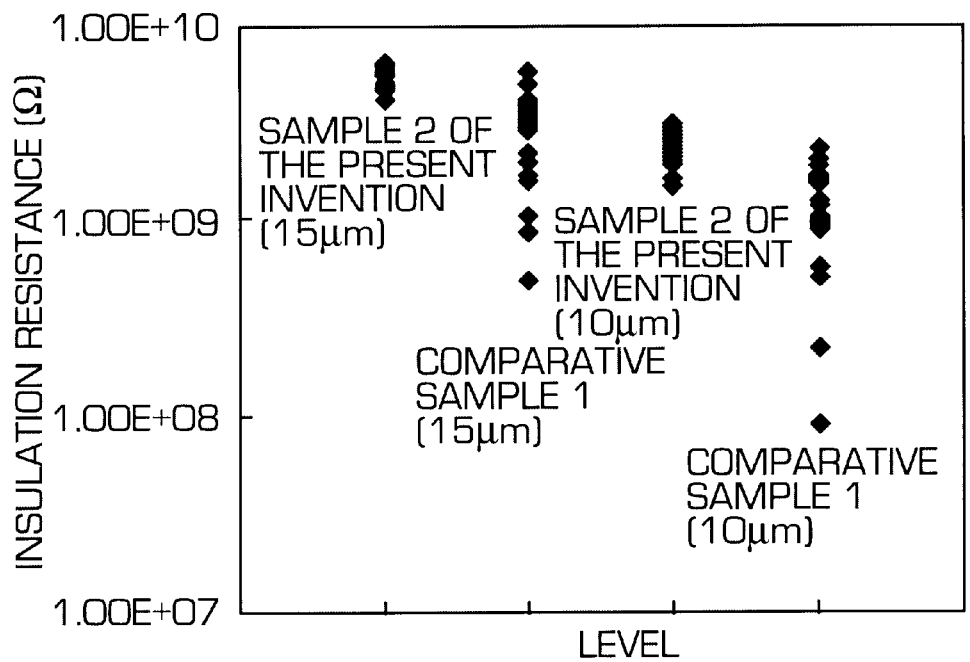
FIG. 3 shows insulation resistances (15 μG/S and 10 μG/S are used) of multilayer ceramic capacitor samples (samples 2 of the present invention) in which an Mn-containing complex oxide $(Mn_{0.1}Mg_{0.9})Nb_2O_6$ in Example 2 of the present invention is used, and samples (comparative samples 1) prepared in a conventional manner. The composition of these samples comprises 30 $Pb(Mg_{1/3}Nb_{2/3})O_3$–50 $Pb(Ni_{1/3}Nb_{2/3})O_3$–20 $PbTiO_3$+1.5 mol % of $Pb(Mn_{1/3}Nb_{2/3})O_3$.

An insulation resistance of the obtained multilayer ceramic capacitor was measured. This measurement was carried out by applying DC of 25 V to the sample, and then measuring a leak current after 60 seconds from the voltage application. An insulation resistance distribution at this time is shown as a sample 2 of the present invention in FIG. 3.

For comparison, a ceramic composition having the same composition ratio as in the sample 2 of the present invention was prepared from raw materials of PbO, MgO, $MnCO_3$, NiO, $Nb_2O_5$ and $TiO_2$ by the same procedure as in Example 2. By the use of this ceramic composition, a multilayer ceramic capacitor having the same structure as mentioned above was formed, and an insulation resistance of the sample was then measured. The thus measured insulation resistance is shown as a comparative sample 1 together with the results of the sample 2 of the present invention in FIG. 3.

EXAMPLE 3

A composition comprising 4 kinds of complex perovskite compounds was used as a ceramic in composition, and its composition ratio was 30 Pb(Mg$_{1/3}$W$_{1/2}$)O$_3$–30 Pb(Ni$_{1/3}$Nb$_{2/3}$)O$_3$–40 PbTiO$_3$+1.5 mol % of Pb(Mn⅓Nb$_{2/3}$)O$_3$. As raw materials, PbO, (Mn$_{0.3}$Ni$_{0.7}$)Nb$_2$O$_6$, MgO, WO$_3$, NiO, Nb$_2$O$_5$ and TiO$_2$ were used, and (Mn$_{0.3}$Ni$_{0.7}$)Nb$_2$O$_6$ which was one of these materials was obtained by weighing predetermined amounts of MnCO$_3$, NiO and Nb$_2$O$_5$, wet-mixing them together with lead core resin balls as a medium in a resin pot for 72 hours, calcining the mixture at 950 to 1,000° C. for 8 hours, wet-grinding the calcined mixture for 72 hours, further firing it at 1,150 to 1,200° C. again, and then wet-grinding it for 72 hours again. Afterward, a powder of the ceramic composition was prepared by the same procedure as in Example 2, and through the same process as in Example 2, a multilayer ceramic capacitor was obtained as a sample 3 of the present invention (however, the thickness of a green sheet was only 15±2 μm).

Figure 4:
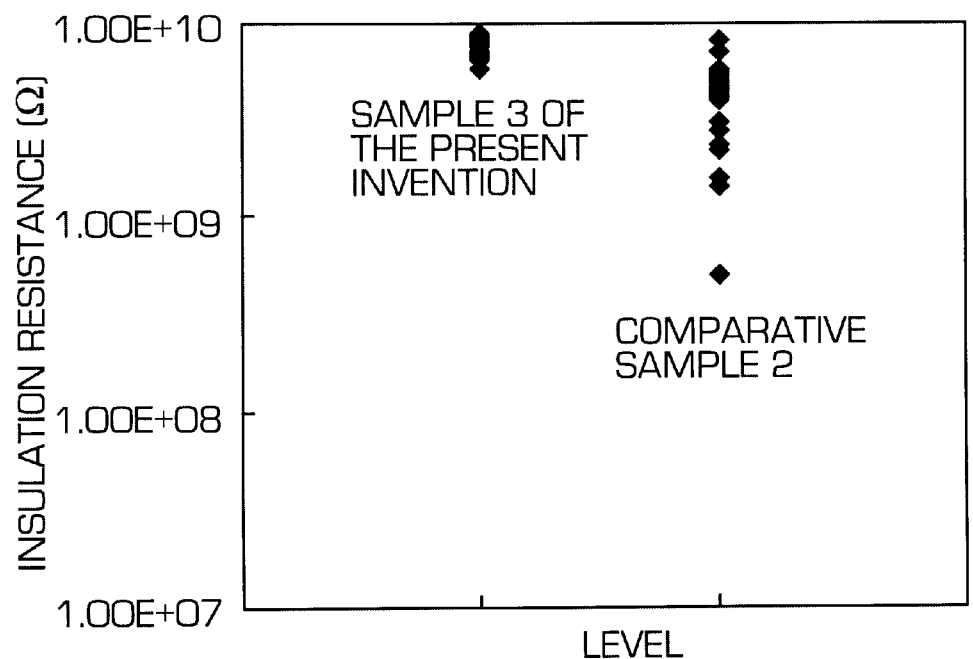
FIG. 4 shows insulation resistances (15 μG/S is used) of a multilayer ceramic capacitor sample (a sample 3 of the present invention) in which an Mn-containing complex oxide ($Mn_{0.3}Ni_{0.7})Nb_2O_6$ in Example 3 of the present invention is used, and a sample (a comparative sample 2) prepared in a conventional manner. The composition of these samples comprises 30 $Pb(Mg_{1/2}W_{1/2})O_3$–30 $Pb(Ni_{1/3}Nb_{2/3})O_3$–40 $PbTiO_3$+1.5 mol % of $Pb(Mn_{1/3}Nb_{2/3})O_3$.

An insulation resistance of the obtained multilayer ceramic capacitor sample was measured in the same manner as in Example 2, and the thus measured insulation resistance is shown in FIG. 4.

For comparison, a ceramic composition having the same composition ratio as in the sample 3 of the present invention was prepared from raw materials of PbO, MgO, WO$_3$, MnCO$_3$, NiO, Nb$_2$O$_5$ and TiO$_2$ by the same procedure as in Example 3. By the use of this ceramic composition, a multilayer ceramic capacitor having the same structure as mentioned above was formed as a comparative sample 2, and an insulation resistance of the sample was then measured. The thus measured insulation resistance is shown together with the results of the sample 3 of the present invention in FIG. 4. However, the thickness of a green sheet was only 15±2 μm.

EXAMPLE 4

A composition comprising 4 kinds of complex perovskite compounds was used as a ceramic composition, and its composition ratio was 30 Pb(Mg$_{1/3}$W$_{1/2}$)O$_3$–30 Pb(Ni$_{1/3}$Nb$_{2/3}$)O$_3$–40 PbTiO$_3$+1.0 mol % of Pb(Mn$_{1/2}$W$_{1/2}$)O$_3$ as in Example 3. As raw materials, PbO, (Mn$_{0.2}$Mg$_{0.8}$)WO$_4$, MgO WO$_3$, NiO, Nb$_2$O$_5$ and TiO$_2$ were used, and (Mn$_{0.2}$Mg$_{0.8}$)WO$_4$ which was one of these materials was obtained by weighing predetermined amounts of MnCO$_3$, MgO and WO$_3$, wet-mixing them together with lead core resin balls as a medium in a resin pot for 72 hours, calcining the mixture at 1,150 to 1,200° C. for 8 hours, wet-grinding the calcined mixture for 72 hours, further firing it at 1,200 to 1,250° C. again, and then wet-grinding it for 72 hours again. Afterward, a powder of the ceramic composition was prepared by the same procedure as in Example 2, and through the same process as in Example 2, a multilayer ceramic capacitor was obtained as a sample 4 of the present invention. However, the thickness of a green sheet was only 15±2 μm.

Figure 5:
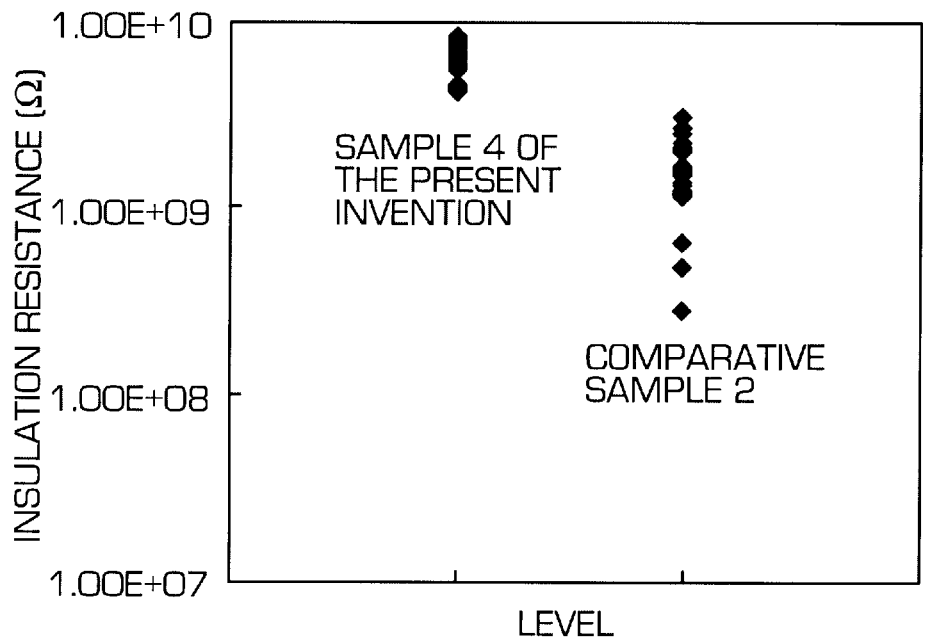
FIG. 5 shows insulation resistances (15 $\mu G/S$ is used) of a multilayer ceramic capacitor sample (a sample 4 of the present invention) in which an Mn-containing complex oxide $(Mn_{0.2}Mg_{0.8})WO_4$ in Example 4 of the present invention is used, and a sample (a comparative sample 3) prepared in a conventional manner. The composition of these samples comprises 30 $Pb(Mg_{1/2}W_{1/2})O_3$–30 $Pb(Ni_{1/3}Nb_{2/3})O_3$–40 $PbTiO_3$+1.0 mol % of $Pb(Mn_{1/2}W_{1/2})O_3$.

An insulation resistance of the obtained multilayer ceramic capacitor sample was measured in the same manner as in Example 2, and the thus measured insulation resistance is shown in FIG. 5.

Usual oxides of all the raw materials in the sample 4 of the present invention were the same as in comparative sample 2 of the multilayer ceramic capacitor. Therefore, for comparison, the measured insulation resistance of the comparative sample 2 is shown together with the results of the sample 4 of the present invention in FIG. 5.

EXAMPLE 5

A composition comprising 4 kinds of complex perovskite compounds was used as a ceramic composition, and its composition ratio was 45 Pb(Mg$_{1/2}$W$_{1/2}$)O$_3$–25 Pb(Zn$_{1/3}$Nb$_{2/3}$)O$_3$–30 PbTiO$_3$+1.5 mol % of Pb(Mn$_{1/3}$Nb$_{2/3}$)O$_3$. As raw materials, PbO, (Mn$_{0.1}$Zn$_{0.9}$)Nb$_2$O$_6$, MgO, WO$_3$, ZnO, Nb$_2$O$_5$ and TiO$_2$ were used, and (Mn$_{0.1}$Zn$_{0.9}$)Nb$_2$O$_6$ which was one of these materials was obtained by weighing predetermined amounts of MnCO$_3$, ZnO and Nb$_2$O$_5$, wet-mixing them together with lead core resin balls as a medium in a resin pot for 72 hours, calcining the mixture at 1,200 to 1,250° C. for 8 hours, wet-grinding the calcined mixture for 72 hours, further firing it at 1,300 to 1,350° C. again, and then wet-grinding it for 72 hours again. Afterward, a powder of the ceramic composition was prepared by the same procedure as in Example 2, and through the same process as in Example 2, a multilayer ceramic capacitor was obtained as a sample 5 of the present invention. However, the thickness of a green sheet was only 15±2 μm.

Figure 6:
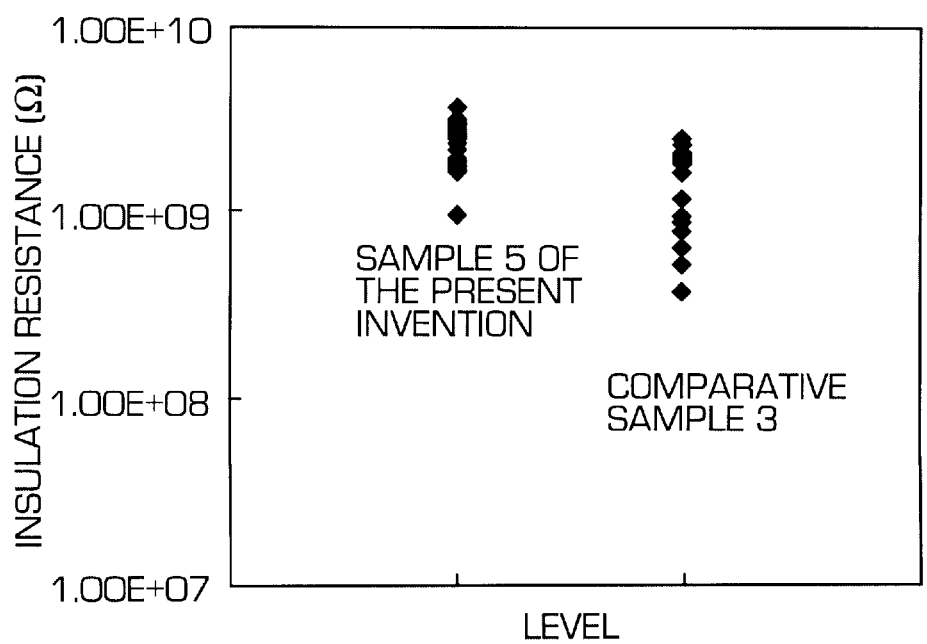
FIG. 6 shows insulation resistances (15 $\mu G/S$ is used) of a mutilayer ceramic capacitor sample (a sample 5 of the present invention) in which an Mn-containing complex oxide $(Mn_{0.1}Zn_{0.9})Nb_2O_6$ in Example 5 of the present invention is used, and a sample (a comparative sample 3) prepared in a conventional manner. The composition of these samples comprises 45 $Pb(Mg_{1/2}W_{1/2})O_3$–25 $Pb(Zn_{1/3}Nb_{2/3})O_3$–40 $PbTiO_3$+1.5 mol % of $Pb(Mn_{1/3}Nb_{2/3})O_3$.

An insulation resistance of the obtained multilayer ceramic capacitor sample was measured in the same manner as in Example 2, and the thus measured insulation resistance is shown in FIG. 6.

For comparison, a ceramic composition having the same composition ratio as in the sample 5 of the present invention was prepared from raw materials of PbO, MgO, WO$_3$, MnCO$_3$, ZnO, Nb$_2$O$_5$ and TiO$_2$ by the same procedure as in Example 5. By the use of this ceramic composition, a multilayer ceramic capacitor having the same structure as mentioned above was formed as a comparative sample 3, and an insulation resistance of the sample was then measured. The thus measured insulation resistance is shown together with the results of the sample 5 of the present invention in FIG. 6. However, the thickness of a green sheet was only 15±2 μm.

As described in Examples 2 to 5, when an insulation resistance of a multilayer ceramic capacitor sample made of a powder of a complex perovskite compound obtained in the case that a complex oxide containing Mn regarding the present invention is used as a raw material is compared with that of a multilayer ceramic capacitor sample made of a powder of a complex perovskite compound obtained in the case that a usual oxide is used as a raw material, it is apparent from FIGS. 3 to 6 that the unevenness of the insulation resistance is smaller and the deterioration of the insulation resistance is also smaller in the case that the complex oxide in Example 1 regarding the present invention is used as the raw material As described above, according to the present invention, there can be provided an Mn-containing complex oxide which can be used in a multilayer ceramic capacitor and in which insulation resistance is less uneven and scarcely deteriorates, and a process for preparing a complex perovskite compound composition by the use of the Mn-containing complex oxide.

What is claimed is:

1. A manganese-containing complex oxide represented by the general formula (Mn$_a$MeI$_{1-a}$)MeII$_b$O$_c$, wherein "a" is a value in the range of 0<"a"<0.3;

MeI is at least one element selected from the group consisting of Mg, Ni and Zn; and MeII is one element selected from the group consisting of Nb, Ta and W;

wherein when MeII is Nb or Ta, then "b" is 2 and "c" is 6; and when MeII is W, then "b" is 1 and "c" is 4.

2. In a process for preparing a composition containing a manganese-containing complex perovskite compound and at least one complex perovskite compound represented by the general formula $Pb(BIBII)O_3$, wherein BI is at least one element selected from the group consisting of Mg, Ni and Zn, and BII is one element selected from the group consisting of Nb, Ta and W, the improvement comprising the step of using a raw material containing the manganese-containing complex oxide of claim 1.

3. The process of claim 2 wherein the composition containing a manganese-containing complex perovskite compound composition contains Mn and from two to five complex perovskite compounds represented by the general formula $Pb(BIBII)O_3$.

* * * * *